United States Patent
Gabriel et al.

(10) Patent No.: US 11,802,191 B2
(45) Date of Patent: Oct. 31, 2023

(54) PROCESSES, POWDERS, AND SHAPED BODIES OF POLYAMIDES AND CALCINED KAOLIN WITH PARTICULAR SIZE DISTRIBUTION

(71) Applicant: BASF SE, Ludwigshafen am Rhein (DE)

(72) Inventors: Claus Gabriel, Ludwigshafen am Rhein (DE); Ruth Lohwasser, Ludwigshafen am Rhein (DE); Rainer Ostermann, Recklinghausen (DE); Simon Gramlich, Ludwigshafen am Rhein (DE); Philipp Kloke, Baiersbronn (DE)

(73) Assignee: BASF SE, Ludwigshafen am Rhein (DE)

( * ) Notice: Subject to any disclaimer, the term of this patent is extended or adjusted under 35 U.S.C. 154(b) by 1216 days.

(21) Appl. No.: 15/999,522

(22) PCT Filed: Feb. 16, 2017

(86) PCT No.: PCT/EP2017/053481
§ 371 (c)(1),
(2) Date: Aug. 17, 2018

(87) PCT Pub. No.: WO2017/140764
PCT Pub. Date: Aug. 24, 2017

(65) Prior Publication Data
US 2021/0206941 A1 Jul. 8, 2021

(30) Foreign Application Priority Data

Feb. 19, 2016 (EP) .................................. 16156543

(51) Int. Cl.
*C08K 3/34* (2006.01)
*B33Y 10/00* (2015.01)
(Continued)

(52) U.S. Cl.
CPC ............ *C08K 3/346* (2013.01); *B29C 64/153* (2017.08); *B33Y 10/00* (2014.12); *B33Y 70/10* (2020.01);
(Continued)

(58) Field of Classification Search
CPC .. C08K 3/346; C08K 2201/005; B33Y 10/00; B33Y 70/10; B33Y 70/00; B29C 64/153;
(Continued)

(56) References Cited

U.S. PATENT DOCUMENTS

| | | | |
|---|---|---|---|
| 3,368,992 A | 2/1968 | Altermatt | |
| 3,446,782 A | 5/1969 | Okazaki et al. | |

(Continued)

FOREIGN PATENT DOCUMENTS

| | | | | |
|---|---|---|---|---|
| CA | 2014857 A1 | * | 10/1990 | ............ C08L 71/123 |
| CA | 3012792 A1 | | 8/2017 | |

(Continued)

OTHER PUBLICATIONS

Koo NPL (https://repositories.lib.utexas.edu/handle/2152/80127?show=full) (Year: 2006).*

(Continued)

*Primary Examiner* — Xiao S Zhao
*Assistant Examiner* — Guy F Mongelli
(74) *Attorney, Agent, or Firm* — Faegre Drinker Biddle & Reath LLP

(57) ABSTRACT

The present invention relates to a method for producing a molded body by the selective laser sintering of a sinter powder (SP). The sinter powder (SP) contains at least one polyamide (P) and 5 to 50 wt %, preferably 10 to 50 wt %, of at least one aluminum silicate. The at least one aluminum silicate has a D50 value in the range of 2.5 to 4.5 μm. The (Continued)

present invention also relates to molded bodies obtainable by means of the method according to the invention.

12 Claims, 1 Drawing Sheet

(51) Int. Cl.
| | |
|---|---|
| *B29C 64/153* | (2017.01) |
| *B33Y 70/10* | (2020.01) |
| *C08G 69/14* | (2006.01) |
| *C08L 77/02* | (2006.01) |
| *C08L 77/06* | (2006.01) |
| *B29K 77/00* | (2006.01) |
| *B29K 309/00* | (2006.01) |

(52) U.S. Cl.
CPC .............. *C08G 69/14* (2013.01); *C08L 77/02* (2013.01); *C08L 77/06* (2013.01); *B29K 2077/00* (2013.01); *B29K 2309/00* (2013.01); *C08K 2201/005* (2013.01); *C08L 2203/30* (2013.01); *C08L 2205/025* (2013.01)

(58) Field of Classification Search
CPC ......... C08G 69/14; C08L 77/02; C08L 77/06; C08L 2203/30; C08L 2205/025; B29K 2077/00; B29K 2309/00
See application file for complete search history.

(56) References Cited

U.S. PATENT DOCUMENTS

| | | | |
|---|---|---|---|
| 3,720,650 A | 12/1972 | Schultze et al. | |
| 3,816,442 A | 6/1974 | Mueller | |
| 4,334,056 A | 6/1982 | Meyer et al. | |
| 5,527,877 A | 6/1996 | Dickens, Jr. et al. | |
| 5,798,403 A * | 8/1998 | Yamashita | C08F 279/02 524/447 |
| 5,932,687 A | 8/1999 | Baumann et al. | |
| 6,136,948 A | 10/2000 | Dickens, Jr. et al. | |
| 6,245,281 B1 | 6/2001 | Scholten et al. | |
| 6,395,809 B1 | 5/2002 | Hayashi et al. | |
| 9,428,610 B2 | 8/2016 | Diekmann et al. | |
| 2003/0180655 A1* | 9/2003 | Fan | G03F 7/202 430/944 |
| 2004/0102559 A1* | 5/2004 | Oyamada | C08K 3/04 524/495 |
| 2004/0127622 A1* | 7/2004 | Pfenninger | C08G 18/10 524/425 |
| 2006/0108567 A1 | 5/2006 | Charati et al. | |
| 2006/0167139 A1* | 7/2006 | Nelson | B82Y 30/00 523/212 |
| 2007/0183918 A1* | 8/2007 | Monsheimer | B23K 26/342 419/53 |
| 2009/0062154 A1* | 3/2009 | Windebank | C04B 35/18 501/141 |
| 2009/0087463 A1* | 4/2009 | Yagyu | A61K 8/25 424/401 |
| 2011/0039979 A1* | 2/2011 | Rexin | C08L 77/02 523/219 |
| 2011/0217495 A1* | 9/2011 | Stoeppelmann | B32B 27/00 428/35.7 |
| 2011/0236698 A1 | 9/2011 | Filou et al. | |
| 2011/0268634 A1* | 11/2011 | Linsenbuhler | B01J 35/04 502/355 |
| 2012/0301664 A1* | 11/2012 | Chapman | B01J 21/08 428/116 |
| 2013/0012643 A1 | 1/2013 | Monsheimer et al. | |
| 2013/0052453 A1 | 2/2013 | Filou et al. | |
| 2013/0253145 A1* | 9/2013 | Sakai | C08G 63/916 525/444 |
| 2017/0267948 A1 | 9/2017 | Kniesel et al. | |
| 2018/0009944 A1 | 1/2018 | Gramlich et al. | |
| 2018/0009950 A1 | 1/2018 | Gramlich et al. | |
| 2018/0208880 A1 | 7/2018 | Kniesel et al. | |
| 2018/0319922 A1* | 11/2018 | Burckhardt | C08G 18/4837 |

FOREIGN PATENT DOCUMENTS

| | | | |
|---|---|---|---|
| CA | 3012952 A1 | 8/2017 | |
| CA | 3013565 A1 | 8/2017 | |
| CH | 549622 A | 5/1974 | |
| CN | 102089372 * | 6/2011 | ............... B29B 9/12 |
| DE | 1089929 B | 9/1960 | |
| DE | 1494563 A1 | 7/1969 | |
| DE | 2458347 A1 | 6/1976 | |
| DE | 2906647 B1 | 4/1980 | |
| EP | 0863174 A1 | 9/1998 | |
| EP | 0911142 A1 | 4/1999 | |
| EP | 2404955 A1 | 1/2012 | |
| EP | 2543701 A1 | 1/2013 | |
| WO | WO-9606881 A2 | 3/1996 | |
| WO | WO-2012041793 A1 | 4/2012 | |
| WO | WO-2017140773 A1 | 8/2017 | |
| WO | WO-2017140779 A1 | 8/2017 | |
| WO | WO-2017140795 A1 | 8/2017 | |

OTHER PUBLICATIONS

Science Direct NPL (https://www.sciencedirect.com/topics/materials-science/montmorillonite) (Year: 2019).*
Cloisite 30B NPL (http://www.lookpolymers.com/polymer_BYK-Cloisite-30B-Nanoclay.php) (Year: 2021).*
Ansari NPL (https://www.sciencedirect.com/science/article/pii/S0032386104002745) (Year: 2004).*
International Search Report for PCT/EP2017/053481 dated May 17, 2017.
International Search Report for PCT/EP2017/053491 dated May 23, 2017.
International Search Report for PCT/EP2017/053500 dated May 31, 2017.
International Search Report for PCT/EP2017/053526 dated May 15, 2017.
Written Opinion of the International Searching Authority for PCT/EP2017/053481 dated May 17, 2017.
Written Opinion of the International Searching Authority for PCT/EP2017/053491 dated May 23, 2017.
Written Opinion of the International Searching Authority for PCT/EP2017/053500 dated May 31, 2017.
Written Opinion of the International Searching Authority for PCT/EP2017/053526 dated May 15, 2017.
Ansari, D., et al., "Correlation of mechanical properties of clay filled polyamide mouldings with chromatographically measured surface energies", Polymer, 2004, vol. 45, No. 11, pp. 3663-3670.
English Translation of International Preliminary Report On Patentability for International Application No. PCT/EP2017/053481, dated Aug. 28, 2018.
Jain, P., et al., "Selective Laser Sintering of Clay-Reinforced Polyamide", Polymer Composites, 2009, pp. 732-743.
Koo, J. H., et al., "Polyamide Nancocomposites For Selective Laser Sintering", 2006, pp. 392-409.

* cited by examiner

PROCESSES, POWDERS, AND SHAPED BODIES OF POLYAMIDES AND CALCINED KAOLIN WITH PARTICULAR SIZE DISTRIBUTION

CROSS-REFERENCE TO RELATED APPLICATIONS

This application is a national stage application (under 35 U.S.C. § 371) of PCT/EP2017/053481, filed Feb. 16, 2017, which claims benefit of European Application No. 16156543.7, filed Feb. 19, 2016, both of which are incorporated herein by reference in their entirety.

The present invention relates to a process for producing a shaped body by selective laser sintering of a sinter powder (SP). The sinter powder (SP) comprises at least one polyamide (P) and in the range from 5% to 50% by weight, preferably in the range from 10% to 50% by weight of at least one aluminosilicate. The at least one aluminosilicate has a D50 in the range from 2.5 to 4.5 μm. The present invention further relates to shaped bodies obtainable by the process of the invention.

The rapid provision of prototypes is a problem which has frequently occurred in recent times. One process which is particularly suitable for this so-called "rapid prototyping" is selective laser sintering. This involves selectively exposing a polymer powder in a chamber to a laser beam. The powder melts, and the molten particles coalesce and solidify again. Repeated application of polymer powder and the subsequent exposure to a laser enables the modeling of three-dimensional shaped bodies.

The process of laser sintering for production of shaped bodies from pulverulent polymers is described in detail in patent specifications U.S. Pat. No. 6,136,948 and WO 96/06881.

Of particular interest are processes for producing reinforced shaped bodies. Various processes for this purpose have been described in the prior art.

US 2013/0052453 describes a thermoplastic pulverulent composition for production of shaped bodies in a selective laser sintering method. This thermoplastic pulverulent composition comprises a filler and a block copolymer. The block copolymer comprises a flexible block and a rigid block. Various materials are disclosed as filler. Preferred fillers are calcium carbonate and magnesium carbonate. The D50 of the filler is <20 μm.

US 2013/0012643 likewise describes a pulverulent composition comprising a polymer and a filler. The filler is ensheathed by the polymer. Glass particles having a D50 in the range from 3 to 100 μm are described as filler. Preferably, the filler has a D50 of 20 to 60 μm. The pulverulent composition can likewise be used in a selective laser sintering process for production of shaped bodies.

EP 2 543 701 likewise describes a pulverulent composition which can be used in a selective laser sintering process for production of shaped bodies. The pulverulent composition comprises polymers and coated fillers. Various materials are described as fillers, especially ceramics and metals.

J. H. Koo et al.: "Polyamide nanocomposites for selective laser sintering" in: "Polyamide nanocomposites for selective laser sintering", 31 Jan. 2006 (2006-01-31), XP055291856, DOI: 10.2514/6.2015-1353, discloses polyamide compositions comprising nylon-11 or nylon-12 and nanoparticles. Nanoparticles tested are montmorillonite, silica gel and carbon nanofibers. The nanoparticles are mixed into the polyamide with an extruder. The montmorillonite compounded into the nylon-11 or nylon-12 has a particle size in the nm range. J. H. Koo et al.: "Polyamide nanocomposites for selective laser sintering" in: "Polyamide nanocomposites for selective laser sintering", 31 Jan. 2006 (2006-01-31), XP055291856, DOI: 10.2514/6.2015-1353, also discloses selective laser sintering experiments. For this purpose, polyamide compositions comprising nylon-11 and montmorillonite and polyamide compositions comprising nylon-11 and carbon nanofibers are subjected to cryogenic grinding in order to obtain a sinter powder. Subsequently, these polyamide compositions are tested in a method of selective laser sintering. It is found here that only the carbon nanofiber-containing polyamide compositions can be processed to shaped bodies in a method of selective laser sintering. It was not possible to produce shaped bodies by selective laser sintering with the montmorillonite-containing polyamide compositions, since the sinter powders obtained were not processible.

Ansari D. M. et al.: "Correlation of mechanical properties of clay filled polyamide mouldings with chromatographically measured surface energies", Polymer, Elsevier Science Publishers B.V., GB, Bd. 45, No. 11, 1 May 2004 (2004-05-01), pages 3663-3670, XP004506671, ISSN: 0032-3861, DOI: 10.1016/J.Polymer.2004.03.045, discloses aluminosilicate-filled nylon-6 compositions for inverse gas chromatography. In addition, the influence of aluminosilicates on the mechanical properties of the nylon-6 compositions is examined. It is found here that the use of aluminosilicates, such as kaolin, leads to a deterioration in impact resistance and notched impact resistance.

A disadvantage of the pulverulent compositions that are described in the prior art for production of shaped bodies by selective laser sintering is that the mechanical reinforcement of the resultant shaped bodies is frequently relatively low, but the resultant shaped body simultaneously becomes brittle. In addition, the fillers described in the prior art frequently have excessive hardness, which makes grinding of the pulverulent composition possible only with difficulty or virtually impossible. Moreover, the fillers used in the prior art frequently have nucleating action, which leads to a reduction in the sintering window of the pulverulent composition. A reduction in the sintering window is disadvantageous, since this results in frequent warpage of the shaped bodies during the production thereof. This warpage virtually rules out use or further processing of the shaped bodies. Even during the production of the shaped bodies, the warpage can be so severe that further layer application is impossible and the production process has to be stopped.

It is thus an object of the present invention to provide a process for producing shaped bodies by selective laser sintering, which has the aforementioned disadvantages of the processes described in the prior art only to a lesser degree, if at all. The process is to be performable in a simple and inexpensive manner, and the shaped bodies obtainable are to have mechanical reinforcement and at the same time a minimum degree of embrittlement. In addition, the shaped bodies obtained are to have improved mechanical properties, especially an improved impact resistance and notched impact resistance.

This object is achieved by a process for producing a shaped body by selective laser sintering of a sinter powder (SP), wherein the sinter powder (SP) comprises at least one polyamide (P) and in the range from 5% to 50% by weight, preferably in the range from 10% to 50% by weight of at least one aluminosilicate, based on the total weight of the sinter powder (SP), said at least one aluminosilicate having a D50 in the range from 2.5 to 4.5 μm.

Figure 1:
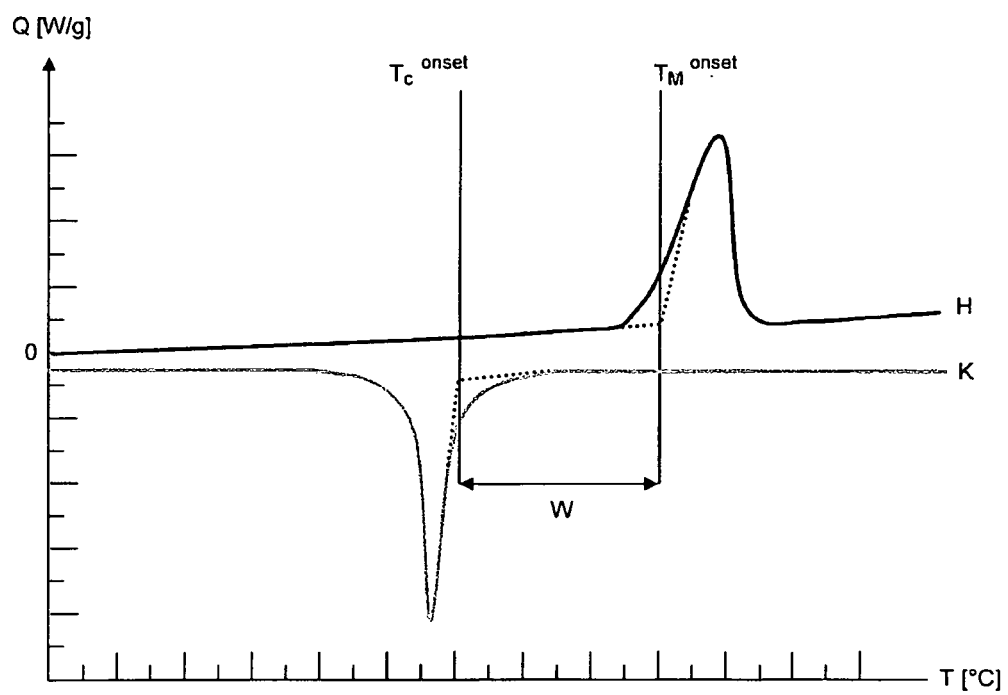
FIG. 1 shows a DSC diagram comprising a heating run (H) and a cooling run (C).

It has been found that, surprisingly, shaped bodies that are produced by selective laser sintering of a sinter powder (SP) comprising at least one polyamide (P) and in the range from 10% to 50% by weight of at least one aluminosilicate are particularly well reinforced without simultaneously becoming brittle. The reinforcement is illustrated particularly clearly by an increased modulus of elasticity and greater elongation at break of the shaped bodies produced in accordance with the invention compared to shaped bodies which are produced from the at least one polyamide (P) without 10% to 50% by weight of the at least one aluminosilicate. The lower embrittlement of the shaped bodies produced in accordance with the invention compared to shaped bodies which are produced from the at least one polyamide (P) without 10% to 50% of the at least one aluminosilicate is especially manifested in the greater elongation at break and in the greater impact resistance and notched impact resistance of the shaped bodies produced in accordance with the invention compared to shaped bodies which are produced from the at least one polyamide (P) without 10% to 50% by weight of the at least one aluminosilicate.

In addition, the shaped bodies produced in accordance with the invention have higher heat distortion resistance.

It is also advantageous that the sinter powder (SP) has good compoundability and grindability. Moreover, the sintering window (W) of the sinter powder (SP) is generally maintained and is not reduced, as is frequently the case for pulverulent compositions as described in the prior art.

The shaped bodies produced in accordance with the invention additionally have less warpage than shaped bodies which are produced solely from the at least one polyamide (P) without 10% to 50% by weight of the at least one aluminosilicate.

In the production of shaped bodies, it is also possible to reuse unmolten sinter powder (SP). Even after several laser sinter cycles, the sinter powder (SP) of the invention has similarly advantageous sintering properties to those in the first sintering cycle.

The process according to the invention is more particularly elucidated hereinbelow.

Selective Laser Sintering

The process of selective laser sintering is known per se to those skilled in the art, for example from U.S. Pat. No. 6,136,948 and WO 96/06881.

In laser sintering a first layer of a sinterable powder is arranged in a powder bed and briefly locally exposed to a laser beam. Only the portion of the sinterable powder exposed to the laser beam is selectively melted (selective laser sintering). The molten sinterable powder coalesces and thus forms a homogeneous melt in the exposed region. The region subsequently cools down again and the sinterable powder resolidifies. The powder bed is then lowered by the layer thickness of the first layer, and a second layer of the sinterable powder is applied and selectively exposed and melted with the laser. This firstly joins the upper second layer of the sinterable powder with the lower first layer; the particles of the sinterable powder within the second layer are also joined to one another by the melting. By repeating the lowering of the powder bed, the application of the sinterable powder and the melting of the sinterable powder, it is possible to produce three-dimensional shaped bodies. The selective exposure of certain locations to the laser beam makes it possible to produce shaped bodies also having cavities for example. No additional support material is necessary since the unmolten sinterable powder itself acts as a support material.

All powders known to those skilled in the art and meltable by exposure to a laser are suitable as sinterable powder in the selective laser sintering. According to the invention, the sinterable powder in the selective laser sintering is the sinter powder (SP).

In the context of the present invention, therefore, the terms "sinterable powder" and "sinter powder (SP)" can be used synonymously; in that case, they have the same meaning.

Suitable lasers for selective laser sintering are known to those skilled in the art and include for example fiber lasers, Nd:YAG lasers (neodymium-doped yttrium aluminum garnet laser) and carbon dioxide lasers.

Of particular importance in the selective laser sintering process is the melting range of the sinterable powder, called the "sintering window (W)". When the sinterable powder is the sinter powder (SP) of the invention, the sintering window (W) is referred to in the context of the present invention as "sintering window ($W_{SP}$)" of the sinter powder (SP). When the sinterable powder is the at least one polyamide (P) present in the sinter powder (SP), the sintering window (W) is referred to in the context of the present invention as "sintering window ($W_P$)" of the at least one polyamide (P).

The sintering window (W) of a sinterable powder can be determined, for example, by differential scanning calorimetry, DSC.

In differential scanning calorimetry, the temperature of a sample, i.e. in the present case a sample of the sinterable powder, and the temperature of a reference are altered in a linear manner with time. For this purpose, heat is supplied to/removed from the sample and the reference. The amount of heat Q necessary to keep the sample at the same temperature as the reference is determined. The amount of heat $Q_R$ supplied to/removed from the reference serves as a reference value.

If the sample undergoes an endothermic phase transformation, an additional amount of heat Q has to be supplied to keep the sample at the same temperature as the reference. If an exothermic phase transformation takes place, an amount of heat Q has to be removed to keep the sample at the same temperature as the reference. The measurement affords a DSC diagram in which the amount of heat Q supplied to/removed from the sample is plotted as a function of temperature T:

Measurement typically involves initially performing a heating run (H), i.e. the sample and the reference are heated in a linear manner. During the melting of the sample (solid/liquid phase transformation), an additional amount of heat Q has to be supplied to keep the sample at the same temperature as the reference. A peak is then observed in the DSC diagram, called the melting peak.

After the heating run (H), a cooling run (C) is typically measured. This involves cooling the sample and the reference in a linear manner, i.e. heat is removed from the sample and the reference. During the crystallization/solidification of the sample (liquid/solid phase transformation), a greater amount of heat Q has to be removed to keep the sample at the same temperature as the reference, since heat is liberated in the course of crystallization/solidification. In the DSC diagram of the cooling run (C), a peak, called the crystallization peak, is then observed in the opposite direction from the melting peak.

Such a DSC diagram comprising a heating run (H) and a cooling run (C) is depicted by way of example in FIG. 1. The DSC diagram can be used to determine the onset temperature of melting ($T_M^{onset}$) and the onset temperature of crystallization ($T_C^{onset}$).

To determine the onset temperature of melting ($T_M^{onset}$), a tangent is drawn against the baseline of the heating run (H) at the temperatures below the melting peak. A second tangent is drawn against the first point of inflection of the melting peak at temperatures below the temperature at the maximum of the melting peak. The two tangents are extrapolated until they intersect. The vertical extrapolation of the intersection to the temperature axis denotes the onset temperature of melting ($T_M^{onset}$).

To determine the onset temperature of crystallization ($T_C^{onset}$), a tangent is drawn against the baseline of the cooling run (C) at the temperatures above the crystallization peak. A second tangent is drawn against the point of inflection of the crystallization peak at temperatures above the temperature at the minimum of the crystallization peak. The two tangents are extrapolated until they intersect. The vertical extrapolation of the intersection to the temperature axis denotes the onset temperature of crystallization ($T_C^{onset}$).

The sintering window (W) is the difference between the onset temperature of melting ($T_M^{onset}$) and the onset temperature of crystallization ($T_C^{onset}$). Thus:

$$W = T_M^{onset} - T_C^{onset}.$$

In the context of the present invention the terms "sintering window (W)", "size of the sintering window (W)" and "difference between the onset temperature of melting ($T_M^{onset}$) and the onset temperature of crystallization ($T_C^{onset}$)" have the same meaning and are used synonymously.

The determination of the sintering window ($W_{SP}$) of the sinter powder (SP) and the determination of the sintering window ($W_P$) of the at least one polyamide (P) are effected as described above. The sample used in that case for determination of the sintering window ($W_{SP}$) of the sinter powder (SP) is the sinter powder (SP), and the sample used for determination of the sintering window ($W_P$) of the at least one polyamide (P) is the at least one polyamide (P).

Sinter Powder (SP)

According to the invention, the sinter powder (SP) comprises the at least one polyamide (P) and in the range from 10% to 50% by weight of the at least one aluminosilicate, based on the total weight of the sinter powder (SP).

The sinter powder (SP) comprises in the range from 10% to 50% by weight, preferably in the range from 10% to 45% by weight and especially preferably in the range from 10% to 40% by weight of the at least one aluminosilicate, based on the total weight of the sinter powder (SP).

The sinter powder (SP) comprises, for example, in the range from 50% to 90% by weight, preferably in the range from 55% to 90% by weight and especially preferably in the range from 60% to 90% by weight of the at least one polyamide (P), based on the total weight of the sinter powder (SP).

In addition, the sinter powder (SP) may comprise at least one additive (A). Suitable additives are known to those skilled in the art. Suitable additives (A) are, for example, selected from the group consisting of antinucleating agents, stabilizers, end group functionalizers and dyes.

The present invention thus also provides a process in which the at least one additive (A) is selected from the group consisting of antinucleating agents, stabilizers, end group functionalizers and dyes.

Suitable antinucleating agents are, for example, nigrosin, neutral red and lithium chloride. Suitable stabilizers are, for example, phenols, phosphites and copper stabilizers. Suitable end group functionalizers are, for example, terephthalic acid and propionic acid. A suitable dye is, for example, carbon black.

The sinter powder (SP) may comprise, for example, in the range from 0.1% to 10% by weight of the at least one additive (A), based on the total weight of the sinter powder (SP). Preferably, the sinter powder (SP) comprises in the range from 0.5% to 8% by weight and especially preferably in the range from 1% to 5% by weight of the at least one additive (A), based in each case on the total weight of the sinter powder (SP).

The present invention thus also provides a process in which the sinter powder (SP) additionally comprises in the range from 0.1% to 10% by weight of at least one additive (A), based on the total weight of the sinter powder (SP).

The sum total of the percentages by weight of the at least one aluminosilicate, the at least one polyamide (P) and optionally the at least one additive (A) typically adds up to 100%.

The sinter powder (SP) can be produced by any method known to those skilled in the art. The sinter powder (SP) is preferably produced by grinding or by precipitation.

The production of the sinter powder (SP) by grinding can be conducted by any method known to those skilled in the art. For example, the at least one polyamide (P), the at least one aluminosilicate and optionally the at least one additive (A) are introduced into a mill and ground therein.

Suitable mills include all mills known to those skilled in the art, for example classifier mills, opposed jet mills, pin mills, hammer mills, ball mills, vibratory mills or rotor mills.

The grinding in the mill can likewise be effected by any method known to those skilled in the art. For example, the grinding can take place under inert gas and/or while cooling with liquid nitrogen. Cooling under liquid nitrogen is preferred.

The grinding temperature is as desired. The grinding is preferably conducted at liquid nitrogen temperatures, for example at a temperature in the range of −210 to −195° C.

The at least one polyamide (P), the at least one aluminosilicate and optionally the at least one additive (A) can be introduced into the mill by any method known to those skilled in the art. For example, the at least one polyamide (P), the at least one aluminosilicate and optionally the at least one additive (A) can be introduced separately into the mill and ground and mixed with one another therein. It is also possible and preferable in accordance with the invention first to compound the at least one polyamide (P), the at least one aluminosilicate and optionally the at least one additive (A) together and then introduce them into the mill.

In an especially preferred embodiment, the production of the sinter powder (SP) comprises the following steps:
i) mixing at least one polyamide (P) with at least one aluminosilicate and optionally at least one additive (A), where the at least one aluminosilicate has a D50 in the range from 2.5 to 4.5 μm, to obtain a mixture comprising at least one polyamide (P), at least one aluminosilicate and optionally at least one further additive (A), where the at least one aluminosilicate has a D50 in the range from 2.5 to 4.5 μm, ii) grinding the mixture obtained in step i) to obtain the sinter powder (SP).

In a further especially preferred embodiment, the production of the sinter powder (SP) comprises the following steps:
i) mixing at least one polyamide (P) with at least one sheet aluminosilicate and optionally at least one additive (A), where the aluminosilicate has a D50 in the range from 2.5 to 4.5 µm, to obtain a mixture comprising at least one polyamide (P), at least one aluminosilicate and optionally at least one additive (A), where the aluminosilicate has a D50 in the range from 2.5 to 4.5 µm,
iia) grinding the mixture obtained in step i) to obtain a polyamide powder,
iib) mixing the polyamide powder obtained in step iia) with a free flow aid to obtain the sinter powder (SP).

Suitable free flow aids are, for example, silicas or aluminas. A preferred free flow aid is alumina. An example of a suitable alumina is Aeroxide® Alu C from Evonik.

If the sinter powder (SP) comprises a free flow aid, it is preferably added in process step iib). The sinter powder (SP) comprises generally 0.1% to 1% by weight, preferably 0.2% to 0.8% by weight and more preferably 0.3% to 0.6% by weight of free flow aid, based in each case on the total weight of the sinter powder (SP) and the free flow aid.

In respect of the above-described processes for producing the sinter powder (SP), the details and preferences described above and hereinafter with regard to the polyamide (P), the additive (A) and the aluminosilicate are correspondingly applicable. The same applies to the quantitative ratios of the at least one polyamide (P) to the at least one aluminosilicate and the additive (A).

The present invention thus also provides a process for producing a sinter powder (SP) comprising the following steps:
i) mixing at least one polyamide (P) with at least one aluminosilicate and optionally at least one additive (A), where the at least one aluminosilicate has a D50 in the range from 2.5 to 4.5 µm, to obtain a mixture comprising at least one polyamide (P), at least one aluminosilicate and optionally at least one further additive (A), where the at least one aluminosilicate has a D50 in the range from 2.5 to 4.5 µm,
ii) grinding the mixture obtained in step i) to obtain the sinter powder (SP).

The present invention also further provides a process for producing a sinter powder (SP), in which step ii) comprises the following steps:
iia) grinding the mixture obtained in step i) to obtain a polyamide powder,
iib) mixing the polyamide powder obtained in step iia) with a free flow aid to obtain the sinter powder (SP).

The present invention further provides the sinter powder (SP) obtainable by the process described above.

In an especially preferred embodiment, the at least one aluminosilicate is present in the polyamide (P). In this embodiment, the at least one polyamide (P) forms the dispersion medium (continuous phase) and the at least one aluminosilicate forms the disperse phase (inner phase). In this embodiment too, the at least one aluminosilicate preferably has a D50 in the range from 2.5 to 4.5 µm, where the following details and preferences with regard to the at least one aluminosilicate are correspondingly applicable.

Processes for compounding (for mixing) are known as such to the person skilled in the art. For example, the at least one polyamide (P), the at least one aluminosilicate and optionally the at least one additive (A) can be compounded in an extruder, then extruded therefrom and introduced into the mill.

When the sinter powder (SP) is produced by precipitation, typically the at least one polyamide (P) is mixed with a solvent (S) and the polyamide (P) is dissolved in the solvent (S), optionally while heating, to obtain a polyamide solution (PS). The polyamide (P) may be partly or fully dissolved in the solvent (S). The polyamide (P) is preferably fully dissolved in the solvent (S). It is thus preferable to obtain a polyamide solution (PS) comprising the polyamide (P) fully dissolved in the solvent (S).

The at least one aluminosilicate is added to the mixture of the at least one polyamide (P) and the solvent (S). The juncture of addition of the at least one aluminosilicate is unimportant, but the addition generally precedes the precipitation of the sinter powder (SP). The at least one aluminosilicate can be added to the solvent (S) before the polyamide (P) is mixed with the solvent (S). It is likewise possible to add the at least one aluminosilicate to the mixture of the at least one polyamide (P) and the solvent (S) before the at least one polyamide (P) is dissolved in the solvent (S). In addition, it is likewise possible to add the at least one aluminosilicate to the polyamide solution (PS).

The at least one aluminosilicate is in suspended form in the mixture of the at least one polyamide (P) and the solvent (S).

The at least one aluminosilicate in that case is the dispersed phase (disperse phase). The solvent (S) or, when the at least one polyamide (P) is dissolved in the solvent (S), the polyamide solution (PS) is the dispersion medium (the continuous phase).

Subsequently, the sinter powder (SP) can be precipitated out of the polyamide solution (PS) comprising the at least one aluminosilicate.

The precipitation can be effected by any method known to those skilled in the art. For example, the sinter powder (SP) can be precipitated by cooling the polyamide solution (PS) comprising the at least one aluminosilicate, distilling the solvent (S) out of the polyamide solution (PS) comprising the at least one aluminosilicate, or adding a precipitant (PR) to the polyamide solution (PS) comprising the at least one aluminosilicate. Preferably, the sinter powder (SP) is precipitated by cooling the polyamide solution (PS) comprising the at least one aluminosilicate.

The solvent (S) used may be exactly one solvent. It is likewise possible to use two or more solvents as the solvent (S). Suitable solvents (S) are, for example, selected from the group consisting of alcohols, lactams and ketones. The solvent (S) is preferably selected from the group consisting of alcohols and lactams.

In accordance with the invention "lactam" is understood to mean generally cyclic amides having 3 to 12 carbon atoms, preferably 4 to 6 carbon atoms, in the ring. Suitable lactams are, for example, selected from the group consisting of propio-3-lactam (β-lactam; β-propiolactam), butyro-4-lactam (γ-lactam; γ-butyrolactam), 2-piperidinone (δ-lactam; δ-valerolactam, hexano-6-lactam (ε-lactam; ε-caprolactam), heptano-7-lactam (ζ-lactam; ζ-heptanolactam), octano-8-lactam (η-lactam; η-octanolactam), nonano-9-lactam (θ-lactam; θ-nonanolactam), decano-10-lactam (ω-decanolactam), undecano-11-lactam (ω-undecanolactam) and dodecano-12-lactam (ω-dodecanolactam).

The lactams may be unsubstituted or at least monosubstituted. If at least monosubstituted lactams are used, the nitrogen atom and/or the ring carbon atoms thereof may bear one, two, or more substituents selected independently of one another from the group consisting of $C_1$- to $C_{10}$-alkyl, $C_5$- to $C_6$-cycloalkyl, and $C_5$- to $C_{10}$-aryl.

Suitable $C_1$- to $C_{10}$-alkyl substituents are, for example, methyl, ethyl, propyl, isopropyl, n-butyl, sec-butyl, and tert-butyl. A suitable $C_5$- to $C_6$-cycloalkyl substituent is for example cyclohexyl. Preferred $C_5$- to $C_{10}$-aryl substituents are phenyl and anthranyl.

Preference is given to using unsubstituted lactams, preference being given to γ-lactam (γ-butyrolactam), δ-lactam (δ-valerolactam) and ε-lactam (ε-caprolactam). Particular preference is given to δ-lactam (δ-valerolactam) and ε-lactam (ε-caprolactam), ε-caprolactam being especially preferred.

The solvent (S) preferably comprises at least 20% by weight of lactam, more preferably at least 25% by weight of lactam, especially preferably at least 30% by weight of lactam and most preferably at least 40% by weight of lactam, based in each case on the total weight of the solvent (S).

Additionally most preferably, the solvent (S) consists of lactam.

It is also preferable when the solvent (S) comprises less than 80% by weight of water, more preferably less than 75% by weight of water, especially preferably less than 70% by weight of water and most preferably less than 60% by weight of water, based in each case on the total weight of the solvent (S).

The lower limit of the water content of the solvent (S) is generally in the range from 0% to 0.5% by weight, preferably in the range from 0% to 0.3% by weight and more preferably in the range from 0% to 0.1% by weight, based in each case on the total weight of the solvent (S).

The at least one polyamide (P) can be dissolved in the solvent (S) at any desired temperature. The at least one polyamide (P) is preferably dissolved in the solvent (S) while heating. The dissolution temperature is, for example, in the range from 80° C. to 200° C., preferably in the range from 90° C. to 190° C. and especially preferably in the range from 120° C. to 180° C.

If the sinter powder (SP) is precipitated out of the polyamide solution (PS) comprising the at least one aluminosilicate by cooling, the polyamide solution (PS) comprising the at least one aluminosilicate can be cooled by any method known to those skilled in the art. The polyamide solution (PS) can be cooled to any temperature. Preferably, the polyamide solution (PS) is cooled to a temperature in the range from 20 to 80° C., more preferably in the range from 20 to 75° C.

It will be appreciated that the temperature to which the polyamide solution (PS) comprising the at least one aluminosilicate is cooled is below the temperature at which the polyamide (P) is dissolved in the solvent (S).

If the sinter powder (SP) is precipitated by cooling the polyamide solution (PS) comprising the at least one aluminosilicate, the polyamide solution (PS) can be stirred, for example, during cooling in order to obtain particularly fine sinter powder particles.

According to the invention, the sinter powder (SP) comprises the at least one polyamide (P) and the at least one aluminosilicate, and optionally the at least one additive (A). The sinter powder (SP) may comprise the at least one polyamide (P) as well as the at least one aluminosilicate and optionally the at least one additive (A). It is likewise possible for the at least one aluminosilicate to be at least partly coated by the at least one polyamide (P) and optionally the additive (A).

The sinter powder (SP) comprises particles. These particles have, for example, a size in the range from 10 to 250 μm, preferably in the range from 15 to 200 μm, more preferably in the range from 20 to 120 μm and especially preferably in the range from 20 to 100 μm.

The sinter powder (SP) of the invention generally has
a D10 in the range from 10 to 30 μm,
a D50 in the range from 25 to 70 μm and
a D90 in the range from 50 to 150 μm.

In a preferred embodiment, the sinter powder (SP) has
a D10 in the range from 20 to 300 μm,
a D50 in the range from 40 to 60 μm and
a D90 in the range from 80 to 100 μm.

In the context of the present invention, the "D10" in this connection is understood to mean the particle size at which 10% by volume of the particles based on the total volume of the particles are smaller than or equal to D10 and 90% by volume of the particles based on the total volume of the particles are larger than D10. By analogy, the "D50" is understood to mean the particle size at which 50% by volume of the particles based on the total volume of the particles are smaller than or equal to D50 and 50% by volume of the particles based on the total volume of the particles are larger than D50. By analogy, the "D90" is understood to mean the particle size at which 90% by volume of the particles based on the total volume of the particles are smaller than or equal to D90 and 10% by volume of the particles based on the total volume of the particles are larger than D90.

To determine the particle sizes, the sinter powder (SP) is suspended in a dry state using compressed air or in a solvent, for example water or ethanol, and this suspension is analyzed. The D10, D50 and D90 values are determined by laser diffraction using a Malvern Mastersizer 3000. Evaluation is by means of Fraunhofer diffraction.

Polyamide (P)

In the context of the present invention "at least one polyamide (P)" is to be understood to mean either exactly one polyamide (P) or a mixture of two or more polyamides (P).

Suitable polyamides (P) generally have a viscosity number of 70 to 350 mL/g, preferably of 70 to 240 mL/g. According to the invention, the viscosity number is determined from a 0.5% by weight solution of the polyamide (P) in 96% by weight sulfuric acid at 25° C. according to ISO 307.

Preferred polyamides (P) are semicrystalline polyamides. Suitable polyamides (P) have a weight-average molecular weight ($M_w$) in the range from 500 to 2 000 000 g/mol, preferably in the range from 5000 to 500 000 g/mol and more preferably in the range from 10 000 to 100 000 g/mol. The weight-average molecular weight ($M_w$) is determined according to ASTM D4001.

Suitable polyamides (P) are for example polyamides (P) which derive from lactams having 7 to 13 ring members. Suitable polyamides (P) further include polyamides (P) obtained by reaction of dicarboxylic acids with diamines.

Examples of polyamides (P) which derive from lactams include polyamides which derive from polycaprolactam, polycaprylolactam and/or polylaurolactam.

Suitable polyamides (P) further include those obtainable from ω-aminoalkyl nitriles. A preferred ω-aminoalkylnitrile is aminocapronitrile, which leads to nylon-6. In addition, dinitriles can be reacted with diamine. Preference is given here to adiponitrile and hexamethylenediamine which polymerize to give nylon-6,6. The polymerization of nitriles is effected in the presence of water and is also known as direct polymerization.

When polyamides (P) obtainable from dicarboxylic acids and diamines are used, dicarboxyalkanes (aliphatic dicarboxylic acids) having 6 to 36 carbon atoms, preferably 6 to 12 carbon atoms and more preferably 6 to 10 carbon atoms may be employed. Aromatic dicarboxylic acids are also suitable.

Examples of dicarboxylic acids include adipic acid, azelaic acid, sebacic acid, dodecanedioic acid and also terephthalic acid and/or isophthalic acid.

Suitable diamines include for example alkanediamines having 4 to 36 carbon atoms, preferably alkanediamines having 6 to 12 carbon atoms, in particular alkanediamines having 6 to 8 carbon atoms, and aromatic diamines, for example m-xylylenediamine, di(4-aminophenyl)methane, di(4-aminocyclohexyl)methane, 2,2-di(4-aminophenyl)propane, 2,2-di(4-aminocyclohexyl)propane and 1,5-diamino-2-methylpentane.

Preferred polyamides (P) are polyhexamethyleneadipamide, polyhexamethylenesebacamide and polycaprolactam and also nylon-6/6,6, in particular having a proportion of caprolactam units of 5% to 95% by weight.

Also suitable are polyamides (P) obtainable by copolymerization of two or more of the monomers mentioned hereinabove and hereinbelow or mixtures of a plurality of polyamides (P) in any desired mixing ratio. Particularly preferred mixtures are mixtures of nylon-6,6 with other polyamides (P), in particular nylon-6/6,6.

Suitable polyamides (P) are accordingly aliphatic, semiaromatic or aromatic polyamides (P). The term "aliphatic polyamides" is understood to mean that the polyamides (P) are formed exclusively from aliphatic monomers. The term "semiaromatic polyamides" is understood to mean that the polyamides (P) are formed from both aliphatic and aromatic monomers. The term "aromatic polyamides" is understood to mean that the polyamides (P) are formed exclusively from aromatic monomers.

The nonexhaustive list which follows comprises the aforementioned polyamides (P) and further polyamides (P) that are suitable for use in the process of the invention and the monomers present.

| AB polymers: | |
|---|---|
| PA 4 | pyrrolidone |
| PA 6 | ε-caprolactam |
| PA 7 | enantholactam |
| PA 8 | caprylolactam |
| PA 9 | 9-aminopelargonic acid |
| PA 11 | 11-aminoundecanoic acid |
| PA 12 | laurolactam |
| AA/BB polymers: | |
| PA 46 | tetramethylenediamine, adipic acid |
| PA 66 | hexamethylenediamine, adipic acid |
| PA 69 | hexamethylenediamine, azelaic acid |
| PA 610 | hexamethylenediamine, sebacic acid |
| PA 612 | hexamethylenediamine, decanedicarboxylic acid |
| PA 613 | hexamethylenediamine, undecanedicarboxylic acid |
| PA 1212 | dodecane-1,12-diamine, decanedicarboxylic acid |
| PA 1313 | tridecane-1,13-diamine, undecanedicarboxylic acid |
| PA 6T | hexamethylenediamine, terephthalic acid |
| PA 9T | nonyldiamine, terephthalic acid |
| PA MXD6 | m-xylylenediamine, adipic acid |
| PA 6I | hexamethylenediamine, isophthalic acid |
| PA 6-3-T | trimethylhexamethylenediamine, terephthalic acid |
| PA 6/6T | (see PA 6 and PA 6T) |
| PA 6/66 | (see PA 6 and PA 66) |
| PA 6/12 | (see PA 6 and PA 12) |
| PA 66/6/610 | (see PA 66, PA 6 and PA 610) |
| PA 6I/6T | (see PA 6I and PA 6T) |
| PA PACM 12 | diaminodicyclohexylmethane, laurolactam |
| PA 6I/6T/PACM | as PA 6I/6T and diaminodicyclohexylmethane |
| PA 12/MACMI | laurolactam, dimethyldiaminodicyclohexylmethane, isophthalic acid |
| PA 12/MACMT | laurolactam, dimethyldiaminodicyclohexylmethane, terephthalic acid |
| PA PDA-T | phenylenediamine, terephthalic acid |

The present invention thus also provides a process in which the at least one polyamide (P) is selected from the group consisting of PA 4, PA 6, PA 7, PA 8, PA 9, PA 11, PA 12, PA 46, PA 66, PA 69, PA 610, PA 612, PA 613, PA 1212, PA 1313, PA 6T, PA MXD6, PA 6I, PA 6-3-T, PA 6/6T, PA 6/66, PA 66/6, PA 6/12, PA 66/6/610, PA 6I/6T, PA PACM 12, PA 6I/6T/PACM, PA 12/MACMI, PA 12/MACMT, PA PDA-T and copolyamides composed of two or more of the aforementioned polyamides.

Preferably, the at least one polyamide (P) is at least one polyamide selected from the group consisting of nylon-6 (PA 6), nylon-6,6 (PA 66), nylon-12 (PA 12), nylon-6/6,6 (PA 6/66), nylon-6,6/6 (PA 66/6) and nylon-6,10 (PA 610)

Particularly preferred as the at least one polyamide (P) are nylon-6 (PA 6) and/or nylon-6,6 (PA 66), with especial preference for nylon-6 (PA 6).

The present invention thus also provides a process in which the at least one polyamide (P) is selected from the group consisting of PA 12, PA 6, PA 66, PA 6/66, PA 66/6 and PA 610.

Aluminosilicate

According to the invention, the sinter powder (SP) comprises at least one aluminosilicate.

In the context of the present invention, "at least one aluminosilicate" is understood to mean either exactly one aluminosilicate or a mixture of two or more aluminosilicates. Preferably in accordance with the invention, the sinter powder (SP) comprises exactly one aluminosilicate.

Aluminosilicates are known as such to those skilled in the art. Aluminosilicates refer to compounds comprising $Al_2O_3$ and SiO2. In structural terms, a common factor among the aluminosilicates is that the silicon atoms are tetrahedrally coordinated by oxygen atoms and the aluminum atoms are octahedrally coordinated by oxygen atoms.

Aluminosilicates may additionally comprise further elements.

Preferably, the at least one aluminosilicate is a sheet silicate. Sheet silicates as such are known to those skilled in the art. In sheet silicates, the silicon atoms coordinated tetrahedrally by oxygen atoms are arranged in layers.

More preferably, the at least one aluminosilicate has been calcined. Especially preferably, the at least one aluminosilicate is a calcined sheet silicate.

In a further particularly preferred embodiment, the at least one aluminosilicate has not been calcined. Furthermore, the at least one aluminosilicate is especially preferably an uncalcined sheet silicate.

The present invention thus also provides a process in which the at least one aluminosilicate is amino-functionalized.

The processes for calcination of aluminosilicates are known as such to those skilled in the art. Typically, the at least one aluminosilicate, for calcination, is heated to a temperature in the range from 1000 to 1300° C., preferably in the range from 1100 to 1200° C.

Without wishing to restrict the present invention thereto, it is assumed that the water of crystallization present in the at least one aluminosilicate is removed by the calcination. It is also assumed that, if the at least one aluminosilicate is a sheet silicate which is calcined, the layer structure is at least partly destroyed.

It is also preferable in accordance with the invention that the aluminosilicate is amino-functionalized. Processes for amino functionalization of aluminosilicates are known as such to those skilled in the art and are described, for example, in Deeba M. Ansaria, Gareth J. Pricea: Correlation of mechanical properties of clay filled polyamide mouldings with chromatographically measured surface energies. Polymer 45 (2004) 3663-3670.

It is thus especially preferred that the at least one aluminosilicate is a calcined sheet silicate which has been amino-functionalized on the surface.

The present invention thus also provides a process in which the at least one aluminosilicate is a calcined sheet silicate.

The at least one aluminosilicate can be used in any desired form. For example, it can be used in the form of the pure aluminosilicate, but it is likewise possible that the aluminosilicate is used in mineral form. Preferably, the aluminosilicate is used in mineral form. Suitable aluminosilicates are, for example, feldspars, zeolites, sodalite, sillimanite, andalusite and kaolin. Kaolin is a preferred aluminosilicate.

The present invention thus also provides a process in which the at least one aluminosilicate is kaolin.

Kaolin is one of the clay rocks and comprises essentially the mineral kaolinite. The empirical formula of kaolinite is $Al_2[(OH)_4/Si_2O_5]$. Kaolinite is a sheet silicate. As well as kaolinite, kaolin typically also comprises further compounds, for example titanium dioxide, sodium oxides and iron oxides. Kaolin preferred in accordance with the invention comprises at least 98% by weight of kaolinite, based on the total weight of the kaolin.

Most preferred as the at least one aluminosilicate is calcined kaolin, the surface of which has been amino-functionalized.

According to the invention, the aluminosilicate has a D50 in the range from 2.5 to 4.5 µm.

Typically, the at least one aluminosilicate has
a D10 in the range from 0.5 to 1.5 µm,
a D50 in the range from 2.5 to 4.5 µm and
a D90 in the range from 8 to 15 µm.

In respect of the determination of the D10, D50 and D90 values, the details and preferences described above for the D10, D50 and D90 values of the sinter powder (SP) are correspondingly applicable.

The present invention thus also provides a process in which the at least one aluminosilicate has
a 010 in the range from 0.5 to 1.5 µm,
a D50 in the range from 2.5 to 4.5 µm and
a D90 in the range from 8 to 15 µm.

The at least one aluminosilicate may take any form known to those skilled in the art. For example, the at least one aluminosilicate may be in platelet form or in particulate form. Preferably, the at least one aluminosilicate is in platelet form.

In the context of the present invention, "in platelet form" is understood to mean that the particles of the at least one aluminosilicate have a ratio of diameter to thickness in the range from 4:1 to 10:1.

Preferably, the at least one aluminosilicate is in particulate form, the particles having maximum sphericity, i.e. a shape of maximum roundness. A measure of this is called the sphericity (SPHT). The sphericity of the particles of the at least one aluminosilicate here indicates the ratio of surface area of the particles of the at least one aluminosilicate to the surface area of ideal spheres of the same volume. The sphericity can be determined by image analysis, for example with the aid of a Camsizer. Processes therefor are known to one skilled in the art.

In the especially preferred sinter powders (SP), the at least one polyamide (P) comprises the at least one aluminosilicate. In this embodiment, the polyamide forms the dispersion medium and the aluminosilicate forms the disperse phase. There are two ways of determining the particle sizes and of determining the D10, D50 and D90 of sheet aluminosilicate present dispersed in the polyamide (P) in the sinter powder (SP). Firstly, it is possible to determine the particle size of the aluminosilicate dispersed in the polyamide (P) by visual means, for example by scanning electron microscopy (SEM). In addition, it is possible to leach the polyamide (P) out of the sinter powder (SP) with a suitable solvent and subsequently to determine the remaining aluminosilicate by means of laser diffraction using a Malvern Mastersizer 3000, the evaluation being affected by means of Fraunhofer diffraction. Suitable solvents for leaching out the polyamide (P) are, for example, formic acid, sulfuric acid (e.g. 96%), a phenol/methanol mixture (75:25) and/or hexafluoroisopropanol.

The invention further provides a process for producing a shaped body by selective laser sintering of a sinter powder (SP), in which the at least one polyamide (P) comprises the at least one aluminosilicate, where the polyamide (P) forms the continuous phase and the at least one aluminosilicate forms the disperse phase, and where the at least one aluminosilicate has a D50 in the range from 2.5 to 4.5 µm.

The present invention further provides a sinter powder (SP) in which the sinter powder (SP) comprises at least one polyamide (P) and in the range from 10% to 50% by weight of at least one aluminosilicate, based on the total weight of the sinter powder (SP), where the at least one aluminosilicate has a D50 in the range from 2.5 to 4.5 µm, where the at least one polyamide (P) comprises the at least one aluminosilicate and where the at least one polyamide (P) forms the continuous phase and the at least one aluminosilicate forms the disperse phase.

Shaped Body

The shaped bodies of the invention are obtained by the process of selective laser sintering described further up. The sinter powder (SP) melted by the laser in the selective exposure resolidifies after the exposure and thus forms the shaped body of the invention. The shaped body can be removed from the powder bed directly after solidification. It is likewise possible first to cool the shaped body and only then to remove it from the powder bed. Any adhering particles of the sinter powder (SP) which has not yet melted can be mechanically removed from the surface by known methods. Methods for surface treatment of the shaped body include, for example, vibratory grinding or barrel polishing, and also sandblasting, glass bead blasting or microbead blasting.

It is also possible to subject the shaped bodies obtained to further processing or, for example, to treat the surfaces.

The shaped body of the invention comprises the at least one polyamide (P) and from 10% to 50% by weight of the at least one aluminosilicate, preferably from 10% to 45% by weight and especially preferably from 10% to 40% by weight of the at least one aluminosilicate, based in each case on the total weight of the shaped body. According to the invention, the at least one aluminosilicate is the at least one aluminosilicate that was present in the sinter powder (SP), and the polyamide (P) is the polyamide (P) that was present in the sinter powder (SP).

When the sinter powder (SP) comprises the at least one additive (A), the shaped body also contains the at least one additive (A) that was present in the sinter powder (SP).

It will be clear to the person skilled in the art that, as a result of the exposure of the sinter powder (SP) to the laser, the at least one polyamide (P), the at least one aluminosilicate and optionally the at least one additive (A) may have entered into chemical reactions and may have been altered as a result. Reactions of this kind are known to those skilled in the art.

Preferably, the at least one polyamide (P), the at least one aluminosilicate and optionally the at least one additive (A) do not enter into any chemical reactions as a result of the exposure of the sinter powder (SP) to the laser; instead, the sinter powder (SP) merely melts.

The present invention thus also provides a shaped body obtainable by the process of the invention.

The invention is elucidated in detail hereinafter by examples, without restriction thereto.

EXAMPLES

The following components were used:

| | |
|---|---|
| Polyamide (P): | (P1) Ultramid ® B22 (nylon-6) from BASF SE |
| | (P2) Ultramid ® B27 (nylon-6) from BASF SE |
| | (P3) Grivory G16 (nylon-6I/6T) from EMS-Grivory |
| | (P4) Ultramid ® C33 (nylon 6/66) from BASF SE |
| Aluminosilicate: | (B1) Translink 445 kaolin from BASF SE d10 = 0.998 µm, d50 = 3.353 µm, d90 = 11.875 µm, determined by means of laser scattering with a Malvern Mastersizer |
| Additive (A): | (A1) nigrosin UB434 |
| | (A2) terephthalic acid |
| | (A3) Irganox 1098 (N,N'-hexane-1,6-diylbis(3-(3,5-di-tert-butyl-4-hydroxyphenylpropionamide))) from BASF SE |
| | (A4) Nylostab S-EED (1,3-benzenedicarboxamide, N,N'-bis(2,2,6,6-tetramethyl-4-piperidinyl) |
| | (A5) Special black 4 carbon black from Evonik |

Production of the sinter powders (C1, I2, C3 and I4)

For production of the sinter powder, the components specified in table 1 were compounded in the ratio specified in table 1 in a twin-screw extruder (ZSK 40) at a speed of 200 rpm, a barrel temperature of 240° C. and a throughput of 50 kg/h with subsequent extrudate pelletization. The thus obtained pelletized material was subjected to cryogenic grinding to obtain the sinter powder.

After the grinding, the powder was dried to a water content of about 0.5% (Aquatrac 3E from Brabender Messtechnik, measurement temperature 160° C., amount of sample 3 to 5 g), and mixed with 0.4% by weight of free flow aid ($Al_2O_3$; Aeroxide® Alu C, from Evonik).

TABLE 1

| Component | C1 | I2 | C3 | I4 |
|---|---|---|---|---|
| P1 [% by wt.] | 97.70 | 67.80 | — | — |
| P2 [% by wt.] | — | — | 78 | 68 |
| P3 [% by wt.] | — | — | 21 | 21 |
| B1 [% by wt.] | — | 30 | — | 10 |
| A1 [% by wt.] | 1.9 | 1.9 | — | — |
| A2 [% by wt.] | 0.4 | 0.3 | — | — |
| A3 [% by wt.] | — | — | 0.5 | 0.5 |
| A4 [% by wt.] | — | — | 0.5 | 0.5 |

Production of Tensile Bars

The sinter powders C1 and I2 were used to produce tensile bars. The sinter powder was introduced with a layer thickness of 0.12 mm into the cavity at the temperature specified in table 2. The sinter powder was subsequently exposed to a laser with the laser power output specified in table 2 and the point spacing specified, with a speed of the laser over the sample during exposure of 5080 mm/s. The point spacing is also known as laser spacing or lane spacing. Selective laser sintering typically involves scanning in stripes. The point spacing gives the distance between the centers of the stripes, i.e. between the two centers of the laser beam for two stripes.

The tensile bars obtained were dried at 80° C. under reduced pressure for 14 days, and then tensile tests were conducted in accordance with ISO 527-2: 2012 at a measuring temperature of 23° C. and a relative air humidity of 50%. The testing speed for determining the modules of elasticity was 1 mm/min; for the determination of other parameters, a testing speed of 5 mm/min was selected. The results are likewise to be found in table 2.

TABLE 2

| | C1a | C1b | C1c | C1d | C1e | I2a | I2b | I2c | I2d | I2e |
|---|---|---|---|---|---|---|---|---|---|---|
| Sinter powder | C1 | C1 | C1 | C1 | C1 | I2 | I2 | I2 | I2 | I2 |
| Laser power output [W] | 22 | 26 | 22 | 26 | 30 | 22 | 26 | 22 | 26 | 30 |
| Point spacing [mm] | 0.3 | 0.3 | 0.25 | 0.25 | 0.25 | 0.3 | 0.3 | 0.25 | 0.25 | 0.25 |
| Temperature [° C.] | 200 | 200 | 200 | 200 | 200 | 205 | 205 | 205 | 205 | 205 |
| Tensile stress at yield [MPa] | 22.83 | 15.34 | 18.72 | 41.24 | 37.53 | 70.45 | 69.64 | 55.93 | 54.75 | 66.69 |
| Elongation at yield [%] | 0.73 | 0.46 | 0.58 | 1.28 | 1.12 | 1.66 | 1.63 | 1.23 | 1.95 | 1.57 |
| Tensile stress at break [MPa] | 22.83 | 15.34 | 18.72 | 41.24 | 37.53 | 70.45 | 69.64 | 55.93 | 54.75 | 66.69 |
| Elongation at break [%] | 0.73 | 0.46 | 0.58 | 1.28 | 1.12 | 1.66 | 1.63 | 1.23 | 1.95 | 1.57 |
| Young's modulus [MPa] | 3057 | 3253 | 3208 | 3370 | 3404 | 5210 | 5061 | 4983 | 5094 | 5081 |

On the basis of the examples cited in table 2, it is clearly apparent that the use of at least one aluminosilicate in the sinter powder (SP) reinforces the shaped bodies obtained, since they have an increased modulus of elasticity and a greater tensile stress at break compared to the sinter powders that do not comprise any aluminosilicate. Moreover, they exhibit distinctly lower embrittlement, which is reflected in a greater elongation at break.

Thermooxidative Stability of the Sinter Powders

The thermooxidative stability of the sinter powders C3 and 14 was determined. To determine the thermooxidative stability of the sinter powders, the viscosity of freshly produced sinter powders and of sinter powders after oven aging at 0.5% oxygen and 195° C. for 16 hours was determined. The ratio of viscosity after storage to the viscosity before storage was determined. The viscosity is measured by means of rotary rheology at a measurement frequency of 0.5 rad/s at a temperature of 240° C. In addition, the sintering window W was determined. The results are to be found in table 3.

TABLE 3

|  | C3 | I4 |
|---|---|---|
| Viscosity ratio | 3.1 | 1.3 |
| Sintering window W [K] | 24.9 | 26.7 |

The oven aging at 0.5% oxygen and 195° C. for 16 hours simulates typical cavity conditions during the selective laser sintering process. It is clearly apparent that the ratio of viscosities after storage to before storage, as a result of the addition of the at least one aluminosilicate to the sinter powder (SP), is only 1.3, whereas it is 3.1 in the case of a sinter powder without the at least one aluminosilicate. This shows that the increase in viscosity which results from the increase in molecular weight through thermooxidative damage to the sinter powder can be reduced significantly through the at least one aluminosilicate. Moreover, the use of the at least one aluminosilicate slightly increases the sintering window, which likewise has a positive effect on the sintering properties.

Production of the sinter powders (C5, I5, I6, I7, C8, I9 and I10)

For production of sinter powders, the components specified in table 5 were compounded in the ratio specified in table 5 in a twin-screw extruder (MC26) at a speed of 300 rpm (revolutions per minute) and a throughput of 10 kg/h at a temperature of 270° C., or 245° C. for formulations comprising (P4), with subsequent extrudate pelletization. The pelletize material thus obtained was subjected to cryogenic grinding to a particle size of 20 to 100 µm. After the grinding, the powder was dried to a water content of about 0.5% (Aquatrac 3E from Brabender Messtechnik, measurement temperature 160° C., amount of sample 3 to 5 g), and mixed with 0.4% by weight of free flow aid ($Al_2O_3$; Aeroxide® Alu C, from Evonik).

The sinter powders obtained were characterized as described above. In addition, the bulk density was determined according to DIN EN ISO 60 and the tamped density according to DIN EN ISO 787-11, as was the Hausner factor as the ratio of tamped density to bulk density. In addition, the particle size distribution, reported as the d10, d50 and d90, as described above, was determined with a Malvern Mastersizer.

The aluminosilicate content of the sinter powder (SP) was determined by gravimetric means after ashing.

The results are reported in tables 6a and 6b.

TABLE 5

| Example | (P2) [% by wt.] | (P3) [% by wt.] | (P4) [% by wt.] | (B1) [% by wt.] | (A3) [% by wt.] | (A5) [% by wt.] |
|---|---|---|---|---|---|---|
| C5 | 78.6 | 21 | — | — | 0.4 | — |
| I5 | 68.2 | 21 | — | 10 | 0.5 | 0.3 |
| I6 | 58.9 | 15.7 | — | 25 | 0.4 | — |
| I7 | 47.0 | 12.6 | — | 40 | 0.4 | — |
| C8 | — | 10 | 89.75 | — | 0.25 | — |
| I9 | — | 7.5 | 66.95 | 25 | 0.25 | 0.3 |
| I10 | — | 6.0 | 53.45 | 40 | 0.25 | 0.3 |

TABLE 6a

| Example | Magnitude of complex viscosity at 0.5 rad/s, 240° C. [Pas] | Ratio of viscosity after aging to before aging | $T_M$ [° C.] | $T_C$ [° C.] | Sintering window W [K] | Sintering window W after aging [K] |
|---|---|---|---|---|---|---|
| C5 | 659 | 2.0 | 217.0 | 170.8 | 26.9 | 27.1 |
| I5 | 592 | 0.73 | 217.6 | 173.3 | 26.7 | — |
| I6 | 959 | 0.68 | 217.3 | 177.9 | 24.3 | 22.1 |
| I7 | 1974 | 1.1 | 217.5 | 177.1 | 24.7 | 22.3 |
| C8 | No powder in SLS quality obtained: lumps formed after grinding | | | | | |
| I9 | 7184 | 1.1 | 193.1 | 150.7 | 26.0 | — |
| I10 | 12572 | 2.2 | 193.4 | 150.9 | 26.5 | 33.7 |

$T_M$ [° C.] melting peak temperature · $T_C$ [° C.] crystallization peak temperature; each determined by means of DSC.

TABLE 6b

| Example | Bulk density [kg/m³] | Tamped density [kg/m³] | Hausner factor | d10 [µm] | d50 [µm] | d90 [µm] | Aluminosilicate content [% by wt.] |
|---|---|---|---|---|---|---|---|
| C5 | 0.51 | 0.64 | 1.25 | 35.0 | 65.0 | 111.7 | 0 |
| I5 | — | — | — | 15 | 43 | 83 | 10 |
| I6 | 0.47 | 0.62 | 1.31 | 37.0 | 63.9 | 106.4 | 24.9 |
| I7 | 0.54 | 0.69 | 1.28 | 36.9 | 63.0 | 104.7 | 38.0 |
| C8 | No powder in SLS quality obtained: lumps formed after grinding | | | | | | |
| I9 | 0.53 | 0.67 | 1.26 | 38.3 | 67.3 | 114.4 | 25.6 |
| I10 | 0.55 | 0.68 | 1.24 | 42.6 | 67.2 | 105.2 | 40.7 |

Production of Tensile Bars

The sinter powders C5, I5, I6, I7, C8, I9 and I10 were used to produce tensile bars.

The sinter powder was introduced with a layer thickness of 0.1 mm into the cavity at the cavity temperature specified in table 7. The sinter powder was subsequently exposed to a laser with the laser power output specified in table 7 and the point spacing specified, with a speed of the laser over the sample during exposure of 5 m/s. The point spacing is also known as laser spacing or lane spacing. Selective laser sintering typically involves scanning in stripes. The point spacing gives the distance between the centers of the stripes, i.e. between the two centers of the laser beam for two stripes.

TABLE 7

| Example | Temperature [° C.] | Laser power [W] | Laser speed [m/s] | Point spacing [mm] |
|---|---|---|---|---|
| C5 | 198 | 25 | 5 | 0.2 |
| I5 | 207 | 35 | 12.5 | 0.2 |
| I6 | 200 | 25 | 5 | 0.2 |
| I7 | 200 | 25 | 5 | 0.2 |
| C8 | No powder obtained, so no test specimens sintered | | | |
| I9 | 176 | 25 | 5 | 0.2 |
| I10 | 182 | 25 | 5 | 0.2 |

Subsequently, the properties of the resultant tensile bars (sinter bars) were determined. The resultant tensile bars (sinter bars) were tested in the dry state after drying at 80° C. for 336 h under reduced pressure. The results are shown in table 9. In addition, Charpy specimens were produced, which were likewise tested under dry conditions (according to ISO179-2/1eU: 1997+Amd.1:2011).

The tensile stress, tensile modulus of elasticity and elongation at break was determined according to ISO 527-1: 2012.

The heat deflection temperature (HDT) was determined according to ISO 75-2:2013, using either Method A with an outer fiber stress of 1.8 N/mm$^2$ or Method B with an outer fiber stress of 0.45 N/mm$^2$.

The processibility of the sinter powder and the warpage of the sinter bars was assessed qualitatively using the scale given in table 8.

TABLE 8

| Grade | Warpage of fractional bar from SLS | Processibility in SLS |
|---|---|---|
| 1 | Very low, flat components | Very good |
| 2 | Low | Good |
| 3 | Moderate | Moderate |
| 4 | Marked | Adequate |
| 5 | Severe | Inadequate |

TABLE 9

| Example | Charpy impact resistance, unnotched [kJ/m$^2$] | Charpy impact resistance, notched [kJ/m$^2$] | Tensile strength [MPa] | Tensile modulus of elasticity [MPa] | Elongation at break [%] | HDT A [° C.] | HDT B [° C.] | Warpage of flexural bar from SLS [grade] | Processibility in SLS [grade] |
|---|---|---|---|---|---|---|---|---|---|
| C5 | 4.9 | 1.5 | 56.7 | 3660 | 1.7 | 94.4 | 150.4 | 3 | 2 |
| I5 | — | — | 70.4 | 4090 | 2.0 | 100.1 | 185.3 | 3 | 2 |
| I6 | 8.7 | 1.8 | 80.0 | 5300 | 2.0 | 112.5 | 203.9 | 3 | 3 |
| I7 | 10.3 | 3.2 | 88.0 | 7093 | 1.8 | 116.8 | 210.2 | 2 | 2 |
| C8 | No powder obtained, so no test specimens sintered | | | | | | | | |
| I9 | 14.9 | 3.1 | 74.2 | 4200 | 3.9 | 93 | 182 | 2 | 2 |
| I10 | | 2.7 | 69.6 | 5040 | 2.0 | 110.3 | 176 | 1 | 2 |

It is apparent that the shaped bodies produced from the sinter powders of the invention have low warpage, and the sinter powder of the invention therefore has good usability in the selective laser sintering method.

In addition, significant advantages of the mechanical properties are apparent, for example elevated heat distortion resistance and also tensile strength and modulus of elasticity. Surprisingly, an elevated elongation at break and an elevated impact resistance (notched and unnotched) are even observed (I6 and I7).

I9 and I10 compared to C8 show that aluminosilicate leads to better grindability and improve mechanical properties of the sinter powder based on low-melting PA6 copolymers.

The invention claimed is:

1. A process for producing a shaped body by selective laser sintering of a sinter powder (SP), wherein the sinter powder (SP) comprises at least one polyamide (P) and in the range from 5% to 50% by weight of at least one aluminosilicate, based on the total weight of the sinter powder (SP), said at least one aluminosilicate having a D50 in the range from 2.5 to 4.5 µm, wherein the D50 values are determined by laser diffraction and, wherein the at least one aluminosilicate is calcined kaolin, and
   wherein the at least one aluminosilicate has
   a D10 in the range from 0.5 to 1.5 µm,
   and
   a D90 in the range from 8 to 15 µm.

2. The process according to claim 1, wherein the at least one polyamide (P) is selected from the group consisting of polyamide-4 (PA 4), polyamide-6 (PA 6), polyamide-7 (PA 7), polyamide-8 (PA 8), polyamide-9 (PA 9), polyamide-11 (PA 11), polyamide-12 (PA 12), polyamide-46 (PA 46), polyamide-66 (PA 66), polyamide-69 (PA 69), polyamide-610 (PA 610), polyamide-612 (PA 612), polyamide-613 (PA 613), polyamide-1212 (PA 1212), polyamide-1313 (PA 1313), polyamide-6T (PA 6T), polyamide-MXD6 (PA MXD6), polyamide-6I (PA 6I), polyamide-6-3-T (PA 6-3-T), polyamide-6/6T (PA 6/6T), polyamide-6/66 (PA 6/66), polyamide-66/6 (PA 66/6), polyamide-6/12 (PA 6/12), polyamide-66/6/610 (PA 66/6/610), polyamide-6I6T (PA 6I/6T), polyamide-PACM 12 (PA PACM 12), polyamide-6I/6T/PACM (PA 6I/6T/PACM), polyamide-12/MACMI (PA 12/MACMI), polyamide-12/MACMT (PA 12/MACMT), polyamide-PDA-T (PA PDA-T) and copolyamides composed of two or more of the abovementioned polyamides.

3. The process according to claim 1, wherein the at least one polyamide (P) is selected from the group consisting of polyamide-12 (PA 12), polyamide-6 (PA 6), polyamide-66 (PA 66), polyamide-6/66 (PA 6/66), polyamide-66/6 (PA 66/6) and polyamide-610 (PA 610).

4. The process according to claim 1, wherein the at least one aluminosilicate is amino-functionalized.

5. The process according to claim 1, wherein the sinter powder (SP) additionally comprises in the range from 0.1% to 10% by weight of at least one additive (A), based on the total weight of the sinter powder (SP).

6. The process according to claim 5, wherein the at least one additive (A) is selected from the group consisting of antinucleating agents, stabilizers, end group functionalizers and dyes.

7. The process according to claim 1, wherein the at least one polyamide (P) comprises the at least one aluminosilicate, where the polyamide (P) forms a continuous phase and the at least one aluminosilicate forms a disperse phase.

8. A shaped body obtained by the process according to claim 1.

9. A process for producing a sinter powder (SP) comprising the following steps:
- i) mixing at least one polyamide (P) with at least one aluminosilicate and optionally at least one additive (A), where the at least one aluminosilicate has a D50 in the range from 2.5 to 4.5 µm, to obtain a mixture comprising at least one polyamide (P), at least one aluminosilicate and optionally at least one further additive (A), where the at least one aluminosilicate has a D50 in the range from 2.5 to 4.5 µm, wherein the at least one aluminosilicate is calcined kaolin, and wherein the at least one aluminosilicate has
- a D10 in the range from 0.5 to 1.5 µm, and
- a D90 in the range from 8 to 15 µm,
- ii) grinding the mixture obtained in step i) to obtain the sinter powder (SP).

10. The process according to claim 9, wherein step ii) comprises the following steps:
- iia) grinding the mixture obtained in step i) to obtain a polyamide powder,
- iib) mixing the polyamide powder obtained in step iia) with a free flow aid to obtain the sinter powder (SP).

11. A sinter powder (SP) obtained by the process according to claim 9.

12. A sinter powder (SP), wherein the sinter powder (SP) comprises at least one polyamide (P) and in the range from 10% to 50% by weight of at least one aluminosilicate, based on the total weight of the sinter powder (SP), where the at least one aluminosilicate has a D50 in the range from 2.5 to 4.5 µm, where the at least one polyamide (P) comprises the at least one aluminosilicate and where the at least one polyamide (P) forms a continuous phase and the at least one aluminosilicate forms a disperse phase, wherein the at least one aluminosilicate is calcined kaolin, and wherein the at least one aluminosilicate has a D10 in the range from 0.5 to 1.5 µm, and a D90 in the range from 8 to 15 µm.

* * * * *